March 9, 1948.    E. R. HERRING ET AL    2,437,467
VARIABLE SPEED DRIVE FOR PROPELLERS
Filed Jan. 3, 1942    2 Sheets-Sheet 1
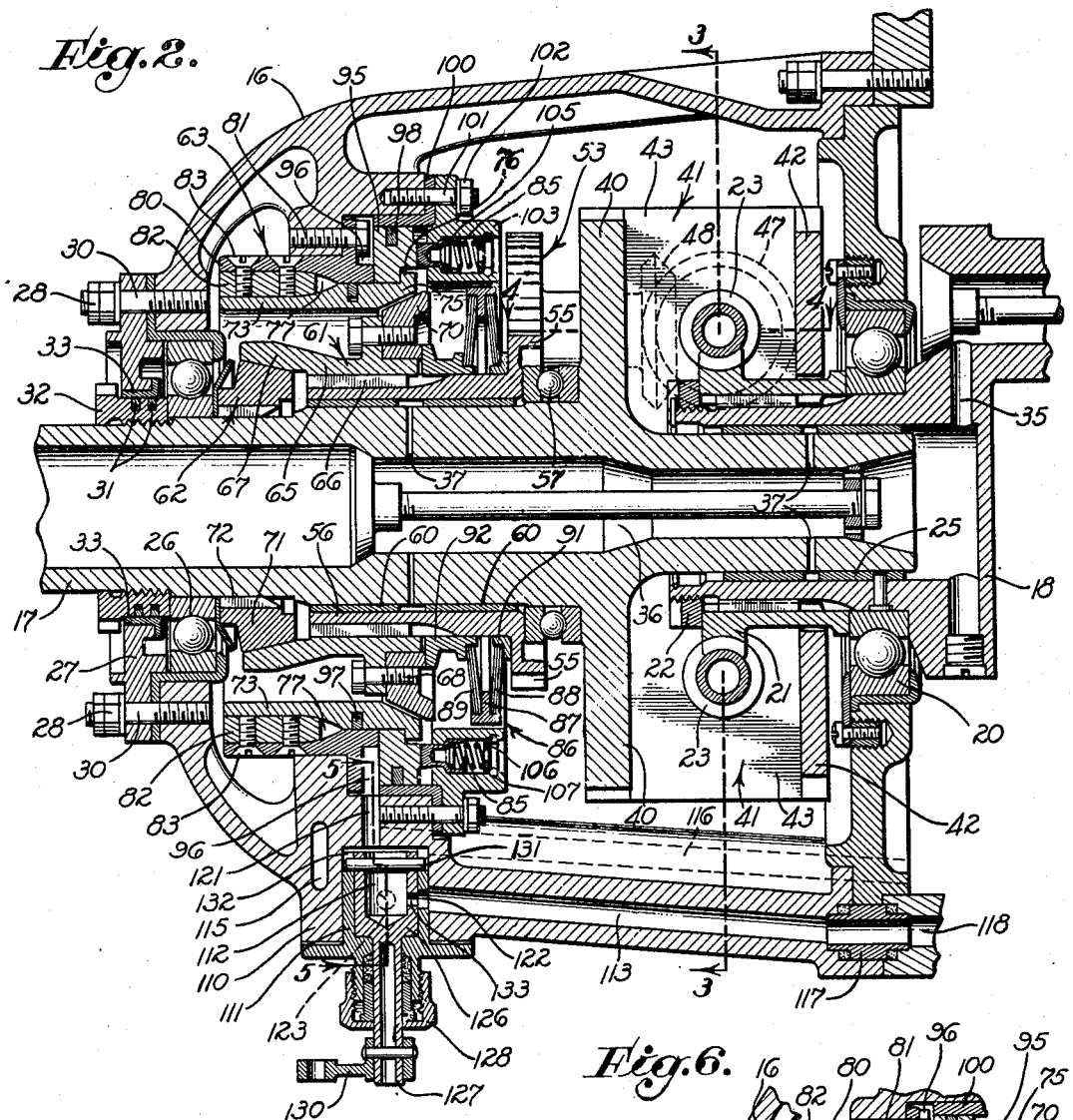
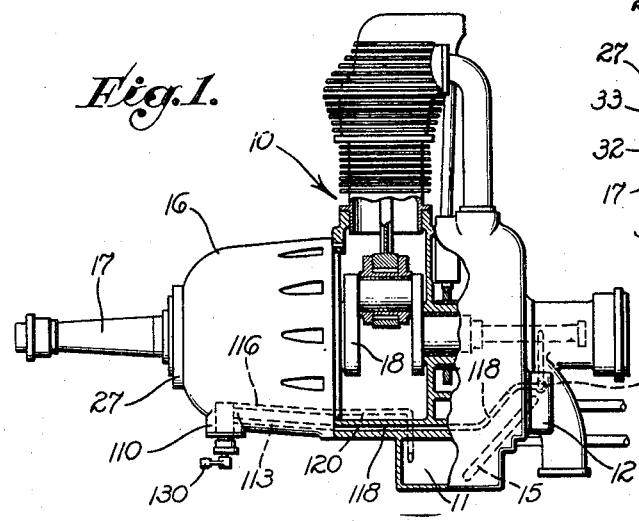
INVENTORS
EARL R. HERRING
CHARLES P. SANDER
BY HARRIS, KIECH, FOSTER & HARRIS
ATTORNEYS March 9, 1948.  E. R. HERRING ET AL  2,437,467
VARIABLE SPEED DRIVE FOR PROPELLERS
Filed Jan. 3, 1942   2 Sheets-Sheet 2

INVENTORS
EARL R. HERRING
CHARLES P. SANDER
BY HARRIS, KIECH, FOSTER & HARRIS
ATTORNEYS

Patented Mar. 9, 1948

2,437,467

UNITED STATES PATENT OFFICE 2,437,467

VARIABLE-SPEED DRIVE FOR PROPELLERS

Earl R. Herring and Charles P. Sander, Glendale, Calif., assignors, by direct and mesne assignments, to Kinner Motors, Inc., a corporation Application January 3, 1942, Serial No. 425,524

14 Claims. (Cl. 74—290)

Our invention relates to a novel variable-speed drive mechanism for airplane propellers and, more particularly, to a compact transmission, preferably hydraulically operated, insuring uninterrupted driving connection between the engine and the propeller during speed ratio changes.

It is very desirable that an airplane engine develop maximum horsepower during the critical take-off period. By use of a controllable pitch propeller, the pitch can be reduced during take-off to permit increase in engine speed to that point where maximum power output is obtained. However, with a fixed-pitch propeller, the power output during take-off is considerably less than the rated output of the engine. For example, in an airplane having a fixed-pitch propeller and an engine rated at 100 H. P. at 2000 R. P. M., the speed during take-off is approximately 1700 R. P. M., at which speed the engine output is approximately 90 H. P.

One object of the present invention is to interpose a variable-speed transmission between the engine and a fixed-pitched propeller to increase the power output available during take-off while at the same time avoiding the use of expensive variable-pitch propellers. It will be understood that various other advantages accrue from the use of the variable-speed device of the invention which permits the pilot to vary the engine-propeller speed ratio while the airplane is on the ground or in flight, without danger of encountering any "neutral" position during the changeover and at which direct driving connection between the engine and the propeller is not realized.

It is another object of the invention to provide an exceptionally compact drive assembly for an airplane propeller that will permit different propeller speeds at the discretion of the pilot without change in R. P. M. of the aircraft power plant.

The general object of our invention is to provide a propeller drive incorporating an efficient and positive planetary transmission of durable and relatively simple construction for varying the propeller speed relative to the engine speed. The contemplated drive mechanism for connecting an engine shaft with a propeller shaft includes a sun gear meshed with at least one planetary gear, and the driving ratio between the two shafts is controlled by controlling the rotation of the sun gear.

Objects of the invention relating to the control of a sun gear in the propeller drive include the following: to provide a gear arrangement in which interlocking the sun gear with one of the above-mentioned shafts to achieve a one-to-one driving ratio between the shafts results in a positive driving connection that precludes any creeping of the planetary gear; to achieve a compact and efficient clutching and engaging arrangement for the sun gear that will provide for at least two different drive ratios; to provide such a clutching and engaging arrangement for two different operative positions with no operative gap between the two positions; to provide in such arrangement a pair of cooperating clutch surfaces and a pair of cooperating brake surfaces so arranged that one pair is always effective, provision being made for each pair to automatically engage before the other pair disengages; and to provide an engaging structure of this type that is adapted for remote control by the airplane pilot, with special reference to remote control by hydraulic means.

One of the objects of the preferred form of our invention is to derive energy for the remote control of the driving gear from the associated power plant in a relatively simple manner. In this aspect, the invention comprehends the use of a hydraulic control for changes in speed ratio, the system preferably utilizing the fluid and pressure of the lubricant circulating system of the power plant. It will be understood, however, that any fluid source may be used in whatever embodiments of the invention involve hydraulic control. In the particular hydraulic arrangement disclosed herein, it is our object to provide an efficient and relatively simple fluid system responsive to a single control and to provide a novel manner for the retention of liquid to insure the fluid transmission of the control force with substantially no lag.

While the invention will be particularly described with reference to its use in interconnecting the engine and propeller of an airplane, it should be clear that certain features of the transmission are novel and can be used in other systems, and it is an object of the present invention to provide a multi-speed transmission incorporating novel gear means and clutch and brake relationships therefor and which can be used to connect a driven shaft to a drive shaft.

The above and other advantages of the invention will be apparent in the detailed description to follow, taken with the accompanying drawings.

In the drawings, which are to be considered as illustrative only:

Figure 1 is a side elevation of an airplane engine equipped with a preferred form of the invention, the view being partly in section;

Figure 2 is an axial section on an enlarged scale of the drive gearings in Figure 1;

Figure 6 is a fragmentary section indicating the construction of a modified form of clutch that may be employed in the practice of the invention.

Figure 3:
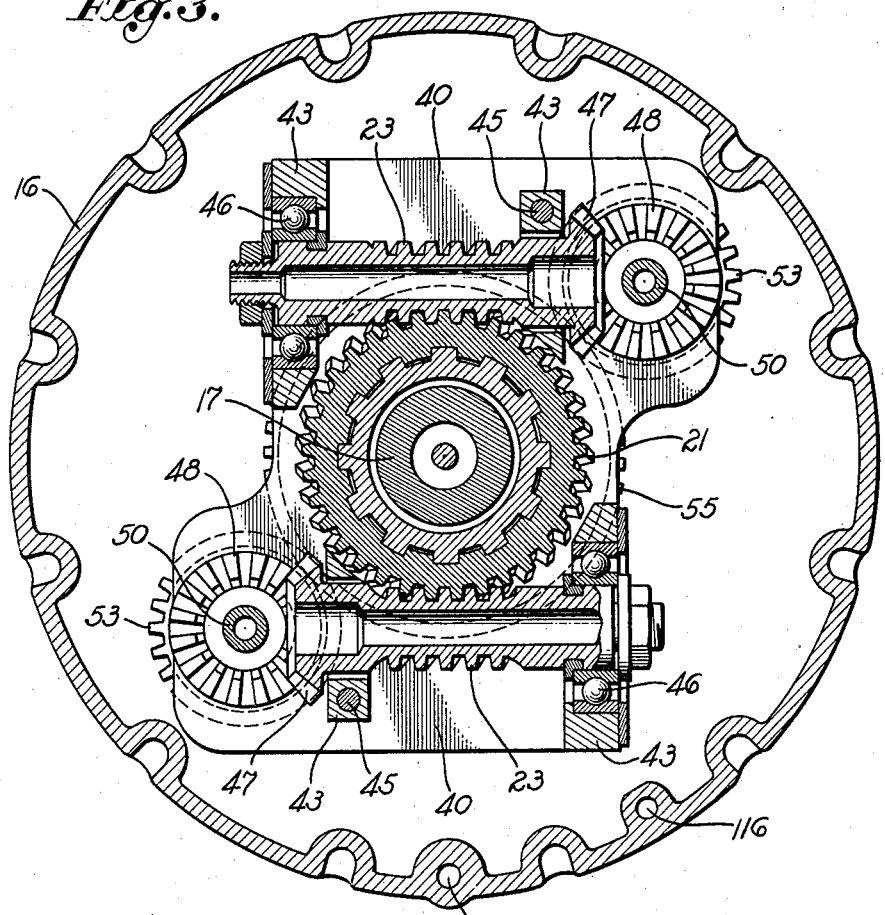
Figure 3 is a transverse section, taken as indicated by the line 3—3 of Figure 2.
Figure 4:
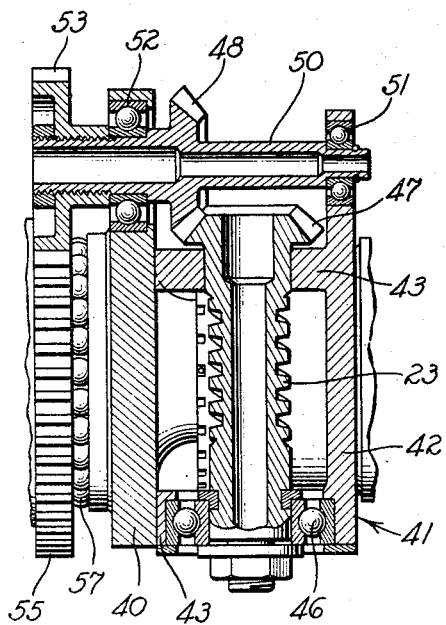
Figure 4 is a fragmentary section, taken as indicated by the line 4—4 of Figure 2.

Figure 1 shows an airplane engine, generally designated 10, having a system for lubricant circulation that includes a crankcase sump 11 and an oil pump 12 having a discharge port 13 and an intake pipe 15 from the sump. Mounted on the front of the engine 10 is a gear housing 16 containing the planetary drive of the present invention by means of which the engine actuates a forwardly-extending propeller shaft 17. The propeller shaft 17 may be aptly termed a rotary driven member, the crank shaft 18 of the engine being the complementary rotary drive member.

As best shown in Figure 2, the rotary drive member or crank shaft 18, which is journaled in an anti-friction bearing 20, carries a worm gear 21 that is keyed thereto and is retained thereon by a suitable nut 22. The worm gear 21 is in constant mesh with one or more worms 23, there being, in the present arrangement, two such worms in diametrically opposite positions. The end of the crank shaft 18 is bored to pilot the rear end of the propeller shaft 17, as shown, and is provided with suitable sleeves 25 to journal the propeller shaft.

The propeller shaft is also journaled in a forward anti-friction bearing 26 that is carried by a forward plate 27, the plate being removably attached to the housing 16 by nuts 28 on a series of studs 30. In the construction shown, a lubricant seal is provided by packing rings 31 that are mounted in a bushing 32 on the propeller shaft in contact with a surrounding liner 33 carried by the forward plate 27. For the purpose of supplying lubricant to various friction surfaces, a lubricant passage 35 in the crank shaft 18 communicates with a lubricant passage 36 in the propeller shaft 17 and lubricant is forced outward through various radial bores 37 in the propeller shaft.

The propeller shaft 17 is formed with two opposite transverse wings 40, on each of which is mounted a bracket or carrier, generally designated 41, to journal one of the worms 23. Each of the carriers 41 is formed with a transverse wall 42 and two spaced longitudinal walls 43 and may be mounted on the face of the corresponding wing 40 by suitable screws 45. Each of the worms 23 is journaled in the two longitudinal walls 43 of the carrier and, preferably, at least one anti-friction bearing 46 is employed. Each worm 23 carries a bevel gear 47 that meshes with a complementary bevel gear 48 on a planet shaft 50. The planet shaft 50 is shown journaled in a bearing 51 on the transverse wall 42 of the carrier 41 and in a bearing 52 on the wing 40 of the propeller shaft. On the forward end of each of the planet shafts 50 is fixed a planet gear 53, the two planet gears being in constant mesh with a common sun gear 55. As best shown in Figure 2, the sun gear 55 may have an extensive cylindrical hub 56 and may be rotatably mounted on the propeller shaft 17 by an anti-friction bearing 57 and a pair of spaced bearing sleeves 60.

The invention includes suitable means under the control of the airplane pilot for controlling the rotation of the worms 23 to effect a change in speed. The invention comprehends use of various control means, the preferred embodiment providing for control of the rotation of the worms 23 through suitable braking means acting, for example, on the sun gear 55, comprising one element of a gear train operatively connected to the worms 23. By way of example, the drawings disclose a system for operatively connecting the sun gear in some suitable manner to one of the rotary members 17, 18 to achieve one speed ratio, with alternate means for controlling the sun gear independently of rotation of either of the two rotary members to achieve another speed ratio. In the present preferred form of the invention, means is provided to connect the sun gear directly with the propeller shaft 17 to cause the sun gear to rotate therewith in a unitary manner, and alternate means is provided to substantially immobilize the sun gear. The particular control arrangement shown by way of example includes a shiftable clutch member or first clutch means 61 which is provided at one end with a clutch part 67 and is operatively connected with the sun gear 55 through the cylindrical hub 56 in a manner to be described. The control arrangement also includes a second clutch means 62 fixedly mounted on the propeller shaft 17, and a third means which is a brake means generally designated at 63 and non-rotatably carried by the gear housing 16.

If the first clutch means 61 is effectively engaged with the second clutch means 62, the sun gear 55 is interlocked with the propeller shaft 17 for rotation therewith. It is contemplated that the threads of the two worms 23 will be of a pitch favorable to reversibility but that only moderate frictional engagement between the first clutch means 61 and the second clutch means 62 will be required to prevent reverse rotation of the worms under driving pressure from the worm gear 21 on the crank shaft 18. Such an arrangement provides for a positive operating connection between the crank shaft and the propeller shaft at a one-to-one driving ratio, with no tendency whatsoever for the two planet gears 53 to creep around the sun gear 55.

If the clutch part 67 of the first clutch means 61 is out of engagement with the second clutch means 62 but is in effective engagement with the brake means 63, the sun gear 55 is immobilized and causes the planet gears 53 to rotate about their axes as they are carried in circular orbits by rotation of the crank shaft 18. The resulting rotation of the worms 23 will cause the propeller shaft 17 to rotate substantially faster than the crank shaft or substantially slower than the crank shaft, depending upon the spiral direction of the worm threads relative to the direction of engine rotation. In the present embodiment of the invention, it is contemplated that the spiral direction of the two worms will be such as to cause the propeller shaft to rotate at a substantially slower rate than the crank shaft 18. Normally, the first clutch means 61 will be engaged through the clutch part 67 with the second clutch means 62 for direct drive of the propeller shaft but, at the pilot's discretion, the first clutch means 61 will be disengaged from the second clutch means and engaged with the brake means 63 to reduce the speed of the propeller shaft with respect to engine speed.

The three engaging means 61, 62, and 63 may be arranged in any suitable manner to achieve the desired control, but we prefer an arrangement that insures the first clutch means being at all times in frictional engagement with one of the other two engaging means, with no gap in engaging operation. One way of accomplishing this is to make two of the engaging means movable in axial directions.

The first clutch means 61 includes a cylindrical member 65 that is slidingly keyed to the cylindrical hub 56 of the sun gear 55 by splines 66, and is formed with a forward conical portion constituting the clutch part 67 for frictional contact with the second clutch means 62. Mounted on the cylindrical member 65 by suitable screws 68 is a conical brake ring 70 for frictional engagement with the brake means 63.

The second clutch means 62 may comprise simply a conical collar 71 complementary to the conical portion 67, the conical collar being keyed to the propeller shaft 17 by suitable splines 72.

The means 63, which acts as a brake but is slidable, includes a cylindrical member 73 that has a conical portion 75 serving as a sort of brake shoe for cooperation with the previously-mentioned brake ring 70. The cylindrical member 73 is formed with a radial flange 76 and a plurality of splines 77, by means of which it is slidingly but non-rotatably mounted in a surrounding fixed collar 80. The collar 80, which is suitably attached to the gear housing 16 by screws 81, is provided with a plurality of splines 82 for sliding engagement with the splines 77, the splines 82 being removably mounted on the fixed collar by suitable screws 83.

In our preferred arrangement, both the first clutch means 61 and the brake means 63 are normally held in the positions shown in Figure 2 by suitable yielding means. Thus, a plurality of small springs 85, which will be described later, are employed to maintain the brake means 63 in its forward position, and a yielding means, generally designated 86, is effective likewise to urge the first clutch means 61 toward a forward position. The yielding means 86 comprises a floating ring 87 from which diverging leaf springs 88 and 89 extend respectively to an annular shoe 91 abutting the sun gear 55 and a second annular shoe 92 slidingly mounted on the sun gear hub 56 in abutment with the first clutch means 61.

To change the relative speed of the propeller shaft 17 from normal, it is necessary merely to shift the brake means 63 progressively rearward from the position shown in Figure 2. The first effect of the rearward shift of the brake means 63 is to carry the conical portion 75 into frictional contact with the conical brake ring 70 so that, momentarily, the first clutch means 61 is in engagement with both the second clutch means 62 and the brake means 63. Continued rearward shift of the brake means 63 forces the first clutch means 61 out of frictional contact with the second clutch means 62, whereupon the brake means 63 becomes effective to retard and then to substantially immobilize the first clutch means 61 to stop rotation of the sun gear 55.

While any suitable control means may be utilized to shift the brake means 63 rearward in opposition to the described yielding means, we prefer, as previously stated, to employ hydraulic control means and to derive the energy for the hydraulic control from the oil pump 12 in the lubricant circulating system of the engine 10.

As best shown in Figure 2, an annular piston 95 is fixedly carried by the brake means 63 in contact with the radial flange 76 of the cylindrical member 73, the piston being, in effect, a movable wall of an annular hydraulic chamber 96. For the purpose of sealing the hydraulic chamber 96 against leakage, a packing ring 97 is mounted on the cylindrical member 73 for sliding contact with the surrounding collar 80, and a packing ring 98 is mounted on the periphery of the piston 95 for contact with a surrounding fixed liner 100. The fixed liner 100 is of angular cross section and is mounted on the gear housing 16 by a plurality of studs 101.

The studs 101 carry nuts 102 for anchoring a ring 103 that is bored to house the previously-mentioned springs 85. Each of the springs 85 presses outward against a suitable plunger 105 that extends into the path of the annular piston 95 to oppose rearward movement of the piston. As indicated in the drawing, each of the springs 85 is compressed between the corresponding plunger 105 and an apertured disc 106 retained in the ring 103 by a split ring 107.

Figure 5:
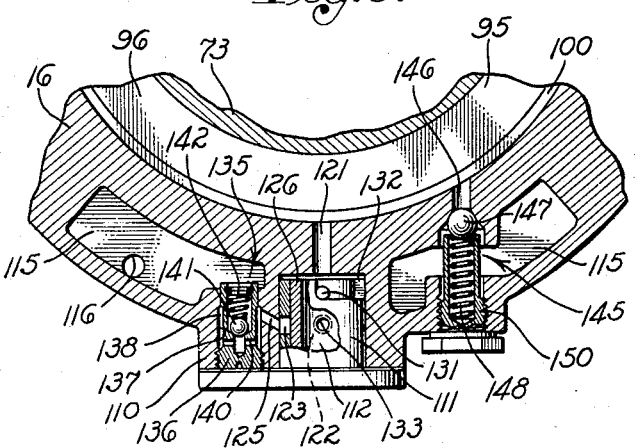
Figure 5 is a fragmentary section, taken as indicated by the line 5—5 of Figure 2.

As shown in Figures 2 and 5, the material of the gear housing 16 provides a downwardly-extending boss 110 which is bored to receive a cylindrical rotatable valve body 111, the valve body forming a valve chamber 112. The material of the gear housing 16 also provides a pressure passage 113 to the valve chamber 112, a U-shaped drainage chamber 115 extending on opposite sides of the boss 110, and a drainage passage 116 from the drainage chamber. As indicated in Figures 1 and 2, the pressure passage 113 communicates through a connecting sleeve 117 with a pressure passage 118 in the engine 10 from the discharge port 13 of the pump 12. In like manner, the drainage passage 116 communicates with a drainage passage 120 in the engine 10 that leads to the oil sump 11.

The annular hydraulic chamber 96, which connects with the valve chamber 112 through a vertical passage 121, may be placed in communication with the pressure passage 113 through a port 122 in the valve body 111 and may be placed in communication with the drainage chamber 115 through a port 123 in the valve body and a small passage 125. To control flow through the valve chamber 112, the valve body 111 is provided with a cylindrical valve member 126 having an operating stem 127 that extends downwardly through a suitable packing gland 128 in the valve body 111. The valve stem is equipped with a suitable operating arm 130 that is remotely controlled by the pilot through a suitable link, not shown in the drawing. The valve member 126 is provided with a diametric stop pin 131 that extends into a pair of quadrant recesses 132 cut in the inner rim of the valve body 111. The valve member 126 is provided with a control port 133 that normally registers with the valve port 123 but may be rotated to a position to register with the valve port 122 to receive fluid under pressure from the passage 113.

One of the features of the preferred form of our invention is the conception of providing what may be termed an oil-retaining valve, generally designated 135, to control drainage flow through the passage 125 from the valve port 123 to the drainage chamber 115. The function of such a valve is to insure the retention of a substantial body of liquid in the hydraulic chamber 96 so that the annular piston 95 will respond substantially instantaneously to rotation of the valve member 126 when the pilot desires to actuate the piston. No delay is required for filling the hydraulic chamber 96 with liquid. As best shown in Figure 5, the oil-retaining valve 135 comprises a body 136 threaded into a suitable bore 137 in the boss 110. The previously-mentioned passage 125 terminates in an annular space 138 surrounding the valve body 136 and the annular space 138 in turn communicates with the interior of the valve body through radial bores 140. Flow through the valve body 136 is normally prevented by a ball member 141 that is continuously urged toward closed position by a suitable spring 142. The oil-retaining member is, in effect, a simple check valve, the spring of which has sufficient strength to retain liquid in the hydraulic chamber 96 but is weak enough to yield to the series of springs 85 that urge the annular piston 95 forward.

The hydraulic system may also include a relief valve to limit the pressure exerted in the hydraulic chamber 96, such a valve being especially desirable if the oil pump 12 creates higher pressure than is desirable in the hydraulic chamber. Such a relief valve, generally designated 145, in Figure 5, may include a bore 146 from the hydraulic chamber 96 to the drainage chamber 115, the bore seating a ball member 147 to oppose flow from the hydraulic chamber. In the particular construction shown, a helical spring 148 to yieldingly urge the ball toward closed position is seated in a hollow plug 150.

The operation of the invention may be readily understood from the foregoing description. Normally, the leaf springs 88 and 89 cause the first means 61 to maintain effective engagement with the clutch means 62, and the series of small springs 85 acting on the piston 95 causes the brake means 63 to maintain a forward position out of contact with the brake ring 70. The normal driving ratio is one-to-one. When the pilot desires to drive the airplane propeller blades at lower than normal R. P. M. or to increase the speed of the engine for the purpose of take-off or climb, the pilot merely manipulates some simple control member in the cockpit to cause the operating arm 130 to rotate the valve member 126. At the normal position of the valve member 126, the port 133 therein registers with the drainage port 123. The rotation away from normal carries the port 133 into registration with the port 122 for the admission of oil from the pressure passage 113 direct from the oil pump 12. The high pressure oil passes upward through the vertical passage 121 into the hydraulic chamber 96 and forces the annular piston 95 to move rearward, the piston overcoming the series of springs 85. The brake means 63 in shifting rearward with the piston 95 initially contacts the brake ring 70 of the first clutch means 61 to force the first clutch means out of engagement with the second clutch means 62. Simultaneously, sufficient frictional contact is established between the brake means 63 and the first clutch means 61 to decelerate and substantially immobilize the first clutch means. The braking of the sun gear 55 causes the planet gears 53 to rotate about their axes as they roll about the sun gear, the worms 23 being rotated correspondingly. Since the pitch and direction of rotation of the worms is such as to cause the worms to travel around the periphery of the worm gear 21 in a circumferential direction opposite to the rotation of the worm gear, the screw travel of the worms 23 is subtracted from the rotation of the crank shaft 18 in transmitting rotation to the propeller shaft 17.

While the hydraulic system is in operation, pressure is maintained by the oil pump 12 and the relief valve 145 opens in response to any excessive pressure to permit oil to return to the sump 11. When the pilot causes the valve member 126 to return to normal position, cutting off the hydraulic chamber 96 from the pressure passage 113, the series of springs 85 shifts the piston 95 forward, with consequent expulsion of oil from the hydraulic chamber through the vertical passage 121 into the valve chamber 112. The oil flows from the valve chamber 112 through the check valve 135 into the drainage chamber 115, the check valve cutting off drainage flow as soon as the piston 95 reaches its normal forward position.

A feature of the invention to be especially noted is the exceptional compactness achieved by the described arrangement of gears, clutches, and hydraulic elements.

Figure 6 shows an alternative clutch and brake arrangement. Many of the parts in Figure 6 are identical with previously-mentioned parts, as indicated by the use of corresponding numbers. The modification is confined to the frictional manner in which the first operating means 151, corresponding to the previously-described first means 61, cooperates with the clutch means 152, corresponding to the previously-described means 62. The first means 151 has keyed thereto a plurality of friction rings 153 that alternate with a plurality of similar friction rings 155. The second series of friction rings 155 are slidingly keyed to the clutch means 152, the clutch means being in turn keyed to the propeller shaft 17. Normally, the pressure exerted by the leaf springs 88 and 89 urging the first means 151 forward causes the friction rings 153 and the friction rings 155 to be pressed together between a thrust ring 156 on the first means and a similar opposed thrust ring 157 on the second means.

The preferred form of our invention, described herein for the purpose of disclosure and to illustrate the principles involved, will suggest to those skilled in the art various changes and substitutions that do not depart from the underlying concept, and we reserve the right to all such changes that fall within the scope of the appended claims.

We claim as our invention:

1. A variable-speed drive adapted to operatively connect an airplane engine with a propeller shaft, including: a rotary drive member; a rotary driven member; a worm gear connected with one of said members to rotate therewith; a worm mounted on the other of said members in mesh with said worm gear; a planet gear mounted on said other of said members, said planet gear being operatively connected with said worm; a sun gear in mesh with said planet gear; clutch means to control the rotation of said sun gear, said clutch means being movable to a position to operatively connect the sun gear with one of said members for rotation of the sun gear; walls forming a hydraulic chamber, said walls including a movable wall operatively connected with said clutch means; a yieldable relief valve to release fluid from said chamber in response to fluid pressure in the space; valve means movable between a first position to cut off said relief valve from said chamber while admitting fluid under pressure into the chamber and a second position to place said relief valve in communication with the chamber; and yielding means to urge said movable wall inward, said yielding means having sufficient strength to force fluid through said relief valve.

2. A variable-speed transmission for use in an airplane having an engine and an oil pump for operatively connecting a rotary drive member from the engine with a rotary driven member to drive the propeller, said transmission comprising: a worm gear connected with one of said members to rotate therewith; a worm mounted on the other of said members in mesh with said worm gear; a planet gear mounted on said other of said members, said planet gear being operatively connected with said worm gear; a sun gear in mesh with said planet gear; a first clutch means movably connected with said sun gear to control rotation of the sun gear; a second clutch means connected to one of said members to be rotated thereby; yielding means to urge said first clutch means into operative engagement with said second clutch means; a non-rotating means movable into operative relation with said first clutch means in a direction to move the first clutch means out of operative engagement with said second clutch means; hydraulic means to move said non-rotating means in opposition to said yielding means, said hydraulic means being in communication with said oil pump to be energized thereby; and means including a valve for remote control of said hydraulic means.

3. A variable-speed transmission for use in an airplane having an engine and an oil pump for operatively connecting a rotary drive member from the engine with a rotary driven member to drive the propeller, said transmission comprising: a worm gear connected with one of said members to rotate therewith; a worm mounted on the other of said members in mesh with said worm gear; a planet gear mounted on said other of said members, said planet gear being operatively connected with said worm gear; a sun gear in mesh with said planet gear; clutch means to control the rotation of said sun gear, said clutch means being movable to a position to operatively connect the sun gear with one of said members for rotation of the sun gear; walls forming a hydraulic chamber, said walls including a movable wall operatively connected with said clutch means; a yieldable relief valve to release fluid from said chamber in response to fluid pressure in the chamber; a control valve means movable between a first position and a second position, said control valve means in said first position cutting off said chamber from said relief valve and placing said chamber in communication with said oil pump for the introduction of liquid under pressure into the chamber, said control valve in said second position placing said relief valve in communication with said chamber; and yielding means to urge said movable wall inward, said yielding means having sufficient strength to force fluid through said relief valve.

4. A variable-speed drive adapted for connecting an airplane engine with a propeller shaft, including: a rotary drive member adapted to be actuated by the engine; a rotary driven member concentric with the axis of said drive member and adapted to be connected to the propeller; a worm gear connected with one of said members to rotate therewith; a worm rotatably mounted on the other of said members at a position to move bodily in an orbit about said axis, said worm being meshed with said worm gear; a planet gear rotatably mounted on said other of said members at a position to move bodily in an orbit about said axis, said planet gear being operatively connected with said worm; a sun gear concentric with said axis and meshed with said planet gear; clutch means and brake means for frictionally affecting the speed of rotation of said planet gear; and control means for rendering said clutch means and brake means alternatively effective with an overlap in such effectiveness to insure that one or the other of the clutch means and brake means is always effective in interconnecting the engine and propeller.

5. A variable-speed drive operatively connecting a rotary drive member with a rotary driven member comprising: a planet gear rotatably carried by one of said members and operatively connected with the other of said members; a sun gear meshed with said planet gear; a first clutch means movably connected with said sun gear to control rotation of the sun gear; a second clutch means; a third means, one of said second and third means being connected to one of said members to be rotated thereby and the other being non-rotating, one of said second and third means being movable relative to said first clutch means and the other being axially fixed; means to move said first clutch means into operative engagement with said axially fixed means; and means to move said relatively movable means into operative engagement with said first clutch means in a direction to force said first clutch means out of operative engagement with said axially fixed means.

6. A variable-speed drive operatively connecting a rotary drive member with a rotary driven member comprising: a planet gear rotatably carried by one of said members and operatively connected with the other of said members; a sun gear meshed with said planet gear; a first clutch means movably connected with said sun gear to control rotation of the sun gear; a second clutch means; a third means, one of said second and third means being connected to one of said members to be rotated thereby and the other being non-rotating, one of said second and third means being movable relative to said first clutch means and the other being axially fixed; yielding means normally holding said first clutch means in operative engagement with said axially fixed means; and means to shift said relatively movable means against said first clutch means to operatively engage said first clutch means and force said first clutch means out of engagement with said axially fixed means.

7. A variable-speed drive operatively connecting a rotary drive member with a rotary driven member comprising: a planet gear rotatably carried by one of said members and operatively connected with the other of said members; a sun gear meshed with said planet gear; a first clutch means movably connected with said sun gear to control rotation of the sun gear; a second clutch means connected to one of said members to be rotated thereby; yielding means to urge said first clutch means into operative engagement with said second clutch means; a non-rotating means movable into operative engagement with said first clutch means in a direction to move the first clutch means out of operative engagement with said second clutch means; and remotely controlled means to move said non-rotating means in opposition to said yielding means.

8. A variable-speed drive operatively connecting a rotary drive member with a rotary driven member comprising: a worm gear connected with one of said members to rotate therewith; a worm mounted on the other of said members in mesh with said worm gear; a planet gear mounted on said other of said members, said planet gear being operatively connected with said worm gear; a sun gear in mesh with said planet gear; a first clutch means movably connected with said sun gear to control rotation of the sun gear; a second clutch means; a third means in the form of brake means, one of said second and third means being connected to one of said members to be rotated thereby and the other being non-rotating, one of said second and third means being movable relative to said first clutch means and the other being axially fixed; yielding means normally holding said first clutch means in operative engagement with said axially fixed means; and remotely controlled means to shift said relatively movable means against said first clutch means to operatively engage said first clutch means and force said first clutch means out of engagement with said axially fixed means.

9. A variable-speed drive operatively connecting a rotary drive member with a rotary driven member comprising: a planet gear rotatably carried by one of said members and operatively connected with the other of said members; a sun gear meshed with said planet gear; clutch and brake means to control the rate of relative rotation of said sun gear thereby to control the drive ratio between said two members; walls forming a hydraulic chamber, said walls including a movable wall operatively connected with said clutch means; a yieldable relief valve to release fluid from said chamber in response to fluid pressure in the chamber; valve means movable between a first position to cut off said relief valve from said chamber while admitting fluid under pressure into the chamber and a second position to place said relief valve in communication with the chamber; and yielding means to urge said movable wall inward, said yielding means having sufficient strength to force fluid through said relief valve.

10. A variable-speed transmission for use with an engine having a lubricating oil pump for operatively connecting a drive member from the engine with a rotary driven member, said transmission comprising: a worm gear connected with one of said members to rotate therewith; a worm mounted on the other of said members in mesh with said worm gear; a planet gear mounted on said other of said members, said planet gear being operatively connected with said worm gear; a sun gear in mesh with said planet gear; a first clutch means movably and operatively connected with said sun gear to control rotation of the sun gear; a second clutch means connected to one of said members to be rotated thereby; yielding means to urge said first clutch means into operative engagement with said second clutch means; a non-rotating means movable into operative engagement with said first clutch means in a direction to move the first clutch means out of operative engagement with said second clutch means; hydraulic means including said oil pump to move said non-rotating means; and a valve for controlling said hydraulic means.

11. A variable-speed drive for operatively connecting an engine with a propeller, comprising: a rotary drive member actuatable by the engine; a rotary driven member adapted to be connected with said propeller, said driven member being concentric with the axis of said drive member; a worm gear connected with said drive member to rotate therewith; a worm rotatably mounted on said driven member to move bodily in an orbit about said axis, said worm being meshed with said worm gear; a planet gear rotatably mounted on said driven member to move in an orbit about said axis, said planet gear being operatively connected with said worm; a sun gear rotatably mounted on said driven member in mesh with said planet gear; and a clutching element connected with said sun gear and movable either to immobilize said sun gear or to connect said sun gear with said driven member for rotation therewith.

12. A variable-speed drive comprising: a rotary drive member; a rotary driven member; a worm gear connected with one of said members to rotate therewith; a worm mounted on the other of said members in mesh with said worm gear to rotate with said other member; a planet gear mounted on said other of said members to rotate therewith, said planet gear being operatively connected with said worm; a sun gear rotatably mounted on one of said members and in mesh with said planet gear; a first clutch part non-rotatably mounted on said other member; a clutch device movably connected with said sun gear and having a second clutch part adapted to engage said clutch part on said other member, said clutch device also having a brake part adapted to engage a braking face; and a relatively non-rotatable means having such a braking face, said clutch device being movable axially to engage and disengage the clutch part on said other member, and said means carrying said brake face being movable axially first to cause said braking face to engage said brake part on said clutch device, and then to disengage said second clutch part from said first clutch part.

13. A variable-speed drive comprising: a rotary drive member; a rotary driven member, said members being mounted on the same axis; a worm gear connected with one of said members to rotate therewith; a worm rotatably mounted on the other of said members in a position to move bodily in an orbit about said axis, said worm being meshed with said worm gear; a planet gear rotatably mounted on said other of said members, said planet gear being operatively connected with said worm; a sun gear concentric with said axis and meshed with said planet gear; a clutch and a brake operatively associated together, said clutch comprising a clutch part non-rotatably mounted on said other of said members and a clutch part non-rotatably connected with the sun gear, and the brake comprising a brake part connected to move with the first-mentioned clutch part and a relatively non-rotary brake part engageable therewith; and control means for rendering said clutch and said brake alternately effective with an overlap in such effectiveness to insure that one or the other of said clutch and said brake is always effective in interconnecting said driven member and said drive member.

14. A drive according to claim 13 wherein the sun gear is mounted on said other of said members, and movement of the control to disengage the clutch acts also to immobilize the sun gear.

EARL R. HERRING.
CHARLES P. SANDER.

REFERENCES CITED

The following references are of record in the file of this patent:

UNITED STATES PATENTS

| Number | Name | Date |
|---|---|---|
| 1,564,318 | Bower | Dec. 8, 1925 |
| 1,654,432 | Rowledge | Dec. 27, 1927 |
| 1,702,244 | Barbarou | Feb. 19, 1929 |
| 1,755,804 | Barbarou | Apr. 22, 1930 |
| 1,895,888 | Lotts | Jan. 31, 1933 |
| 2,069,408 | Forichon | Feb. 2, 1937 |
| 2,136,971 | Fleischel | Nov. 15, 1938 |
| 2,245,815 | Peterson et al. | June 17, 1941 |
| 2,318,481 | Greenlee | May 4, 1943 |

FOREIGN PATENTS

| Number | Country | Date |
|---|---|---|
| 851,130 | France | Sept. 25, 1939 |